(12) United States Patent
Patton et al.

(10) Patent No.: US 10,906,070 B2
(45) Date of Patent: Feb. 2, 2021

(54) REMOVAL OF COFFEE GROUNDS FROM A PORTAFILTER

(71) Applicant: Viva Caffeina, LLC, Asheville, NC (US)

(72) Inventors: Ronald Patton, Asheville, NC (US); Valerie Patton, Asheville, NC (US); Zachariah Acquaviva, Asheville, NC (US)

(73) Assignee: Viva Caffeina, LLC, Asheville, NC (US)

( * ) Notice: Subject to any disclaimer, the term of this patent is extended or adjusted under 35 U.S.C. 154(b) by 160 days.

(21) Appl. No.: 15/830,613

(22) Filed: Dec. 4, 2017

(65) Prior Publication Data

US 2018/0161823 A1    Jun. 14, 2018

Related U.S. Application Data

(60) Provisional application No. 62/432,559, filed on Dec. 9, 2016.

(51) Int. Cl.
*B08B 3/02* (2006.01)
*A47J 31/60* (2006.01)
(Continued)

(52) U.S. Cl.
CPC ............. *B08B 3/02* (2013.01); *A47J 31/0663* (2013.01); *A47J 31/30* (2013.01); *A47J 31/60* (2013.01);
(Continued)

(58) Field of Classification Search
CPC ...................................................... B08B 3/02
See application file for complete search history.

(56) References Cited

U.S. PATENT DOCUMENTS

| | | | |
|---|---|---|---|
| 4,544,529 A | 10/1985 | Hoeck | |
| 5,915,869 A * | 6/1999 | Agosto | .................. A47L 13/07 |
| | | | 15/104.93 |

(Continued)

FOREIGN PATENT DOCUMENTS

| | | | |
|---|---|---|---|
| DE | 4136923 A1 | 5/1993 | |
| DE | 10200340 A1 * | 7/2003 | ............. A47L 17/00 |

(Continued)

OTHER PUBLICATIONS

English machine translation of JP11-221187.*
International Search Report dated Mar. 26, 2018 in corresponding PCT/US2017/064501.

*Primary Examiner* — Michael E Barr
*Assistant Examiner* — Jason P Riggleman
(74) *Attorney, Agent, or Firm* — Luedeka Neely Group, P.C.

(57) ABSTRACT

An apparatus for use in cleaning a portafilter includes a portafilter receiver with a central opening. A landing area extends over at least a portion of the central opening. Spent grounds fall through a hole in the landing area when an inverted portafilter is positioned over the landing area during the cleaning process. Left and right retention members are spaced vertically above the landing area and portafilter receiving slots are defined between the retention members and the landing area. The receiving slots securely hold the portafilter above the landing area and center the cup portion of the portafilter over the hole. A receiving box is mounted below the portafilter receiver and receives the spent coffee grounds. A steam tube mounted to the receiving box connects to a pressurized steam supply and, when activated, directs pressurized steam through the hole of the landing area and into the cup portion of the inverted portafilter.

14 Claims, 14 Drawing Sheets

(51) Int. Cl.
    *B08B 9/28*     (2006.01)
    *A47J 31/06*    (2006.01)
    *A47J 31/30*    (2006.01)
    *A47J 31/44*    (2006.01)

(52) U.S. Cl.
    CPC ........... *B08B 9/283* (2013.01); *A47J 31/4489* (2013.01); *B08B 2230/01* (2013.01)

(56) References Cited

U.S. PATENT DOCUMENTS

| | | | |
|---|---|---|---|
| 6,718,591 B2 * | 4/2004 | Marsh | A47L 13/16 |
| | | | 15/229.13 |
| 8,322,355 B2 | 12/2012 | Nagatani et al. | |
| 2010/0037925 A1 | 2/2010 | Kappel et al. | |
| 2010/0071724 A1 | 3/2010 | Baumgartner et al. | |
| 2011/0030562 A1 | 2/2011 | Ambrosini | |
| 2012/0156339 A1 | 6/2012 | Studor et al. | |
| 2014/0283877 A1 | 9/2014 | Sonoda | |

FOREIGN PATENT DOCUMENTS

| | | | | |
|---|---|---|---|---|
| EP | 0593876 | A1 | | 4/1994 |
| EP | 1803380 | A3 | | 2/2012 |
| EP | 2620084 | A1 | | 7/2013 |
| EP | 2732743 | B1 | | 9/2015 |
| EP | 3158901 | A1 * | | 4/2017 |
| FR | 2425833 | | * | 12/1979 |
| IT | 1226164 | | | 12/1990 |
| JP | 11-221187 | | * | 8/1999 ............. A47L 17/00 |
| KR | 2014-0103713 | A | * | 8/2014 |
| KR | 20140103713 | A | | 8/2014 |
| KR | 101682352 | B1 | | 12/2016 |

\* cited by examiner

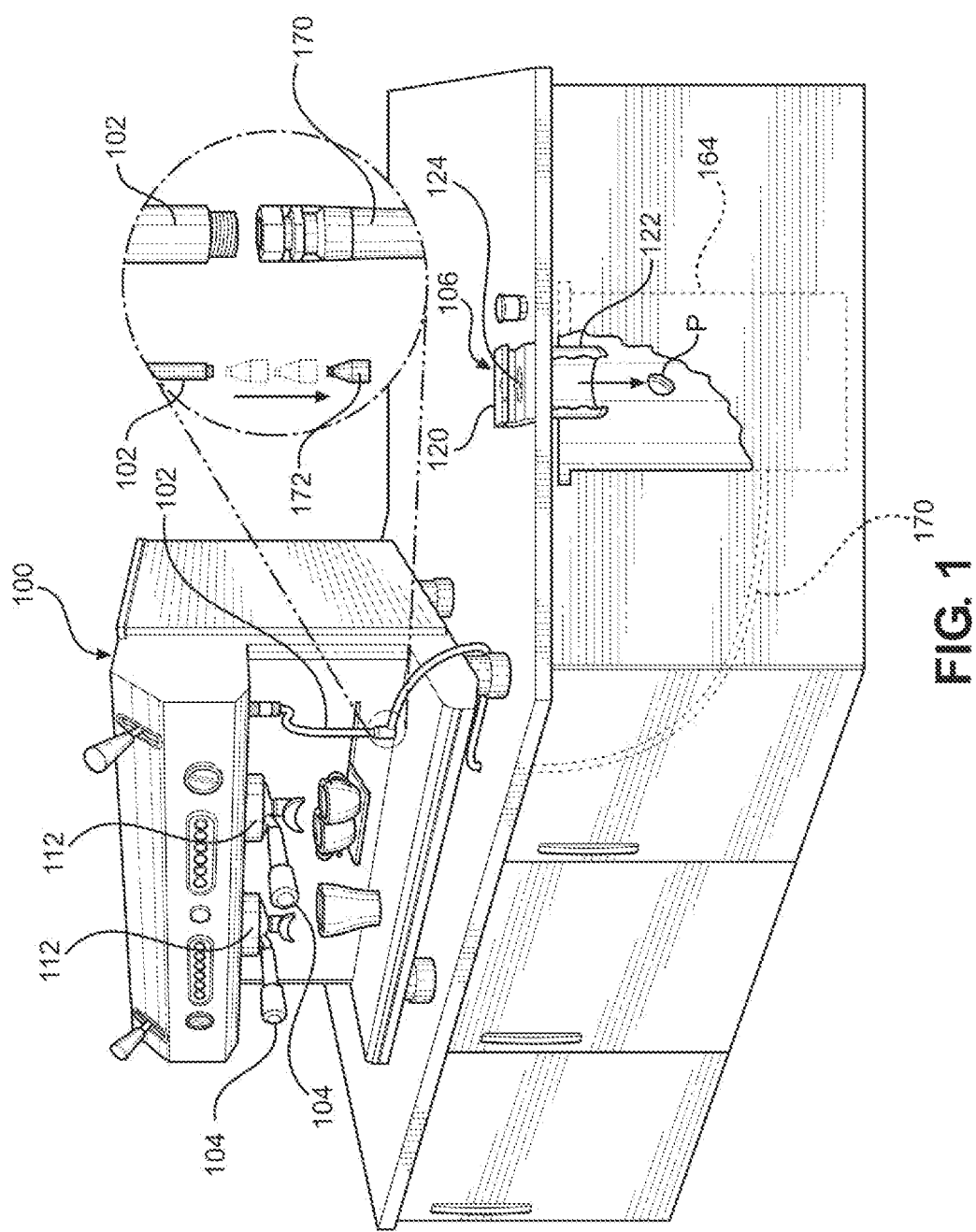

REMOVAL OF COFFEE GROUNDS FROM A PORTAFILTER

CROSS-REFERENCE TO RELATED APPLICATIONS

This application claims the benefit of U.S. Provisional Application No. 62/432,559, filed Dec. 9, 2017 and entitled "REMOVAL OF COFFEE GROUNDS FROM A PORTAFILTER," the disclosure of which is incorporated by reference herein in its entirety.

FIELD OF THE INVENTION

The invention relates to generally to coffee espresso preparation, and, more particularly, to removing spent coffee grounds from a portafilter.

BACKGROUND AND SUMMARY

An espresso machine brews coffee by forcing pressurized near boiling water through a "puck" of ground coffee. A thick, concentrated coffee called "espresso" is thereby extracted. Extracting is also known as pulling. A grouphead is the mechanical receiver on an espresso machine for a removable portafilter, which holds the puck of coffee. A typical consumer espresso machine has one grouphead. Professional machines, such as those used at commercial coffee shops, usually have two or more groupheads. During the process of extracting a shot of espresso, hot water is forced through the grouphead under pressure.

A portafilter attaches to the grouphead of an espresso machine and holds a tamped puck of coffee grounds within a basket. A portafilter is usually made of brass or stainless steel, with a plastic or wooden handle. The portafilter forms a seal with the a grouphead gasket of the espresso machine, and directs high-pressure hot water through the coffee puck to extract espresso.

A steam wand is a metal tube with a specialized spray tip that emits steam. The emitted steam is used to steam and froth liquids (e.g., milk) for coffee drinks such as café lattes. Most commercial espresso machines have multiple steam wands, one per grouphead, although in many applications not all of them are used.

A knockbox is a device used to release and store spent espresso grounds (or pucks) after a shot of espresso has been pulled. A knockbox is generally a small open top box made from stainless steel. The box has a sturdy rubber covered bar (also known as a bash bar) against which a portafilter is "knocked" to forcibly release the puck. Knockboxes are typically very sturdy as they are subject to repetitive knocking and tapping to dislodge espresso pucks after use. Knockboxes can sit on a countertop, collecting pucks in their own box. Alternatively, knockboxes, can be flush mounted into a countertop, collecting pucks through a chute into a trash receptacle underneath.

A barista towel is general purpose terrycloth towel used to wipe up coffee grounds, drips and spills of liquid coffee, milks, and flavorings occurring at the barista's stations. The barista towel is also used to wipe coffee grounds out of the portafilter that remain after the puck is removed using the knock box. Between uses, the barista towel usually resides on the countertop, in the barista's apron pocket, or looped over the barista's belt or pants waist for easy access. The towel is exchanged for a clean, fresh one, at the barista's discretion.

A repetitive strain injury (RSI) is an injury to the musculoskeletal and nervous systems that may be caused by repetitive tasks, forceful exertions, vibrations, mechanical compression, or sustained or awkward positions. Carpal tunnel syndrome is a medical condition due to compression of the median nerve as it travels through the wrist at the carpal tunnel and is often caused by repetitive strain.

Traditionally, and as standard practice, a barista removes spent coffee grounds contained in a portafilter by physically and forcefully banging (knocking) the portafilter against the bash bar on the knockbox, followed by visually inspecting the portafilter for remaining grounds. Sometimes re-knocking, visually re-inspecting, and then wiping any remaining grounds from the portafilter with the towel are required. Once the portafilter is completely clean of spent grounds and moisture, the portafilter is used again for making another shot of espresso.

Standard practice has several negative aspects. First, the standard practice described above is loud and disruptive. Although the sounds are an annoyance, they have become an accepted annoyance. Next, the standard practice is not 100% reliable. Multiple knocks are often required to clear the puck. Even then, coffee grounds and oils often remain stuck to the sides of the portafilter, and need to be removed with a towel before packing the portafilter with coffee for the next extraction. The standard practice can be unsanitary. Any remaining spent coffee grounds that are not removed through the knock process must be wiped out with the barista's towel. That towel may have hung from his or her belt for several hours and may have also been used to clean up spills of milk and other liquids. The standard practice causes the portafilter to cool. Every second that a portafilter is not mounted in the grouphead it loses heat. Once the portafilter is cleaned and re-attached to the grouphead, the proper technique is to wait for the portafilter to warm back up. This can take many seconds, but in a busy coffee shop every second counts. The standard practice can cause repetitive strain injury. The actions of banging the portafilter against the bash bar and wiping spent grounds out of the portafilter hundreds of time per work shift are extremely hard on the barista's hand, wrist, and forearm and can cause repetitive strain injuries.

Accordingly, what is needed is an apparatus for use in cleaning a portafilter that addresses the issues discussed above. The above and other needs are met by an apparatus for use in cleaning a portafilter.

In one aspect, the apparatus for cleaning a portafilter includes a portafilter receiver over which the portafilter is inverted and a steam tube having a steam inlet configured to connect to a pressurized steam supply and a steam outlet oriented to direct pressurized steam into the cup portion of the portafilter. The apparatus further includes a drying nub having a top drying portion configured to removably connect to the portafilter receiver or another surface.

In one aspect, a drying nub comprising a drying portion that is fixedly mounted to a mounting surface and is sized and configured to fit inside of a cup portion of a portafilter for cleaning and drying the portafilter.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 1 depicts an espresso machine having multiple portafilters and an apparatus for cleaning a portafilter located adjacent and mounted to the expresso machine according to an embodiment of the present invention;

FIG. 11 is sectional view depicting portafilter after being placed into the portafilter receiver and having a steam tube being correctly located with respect to the portafilter;

DETAILED DESCRIPTION

Figure 21:
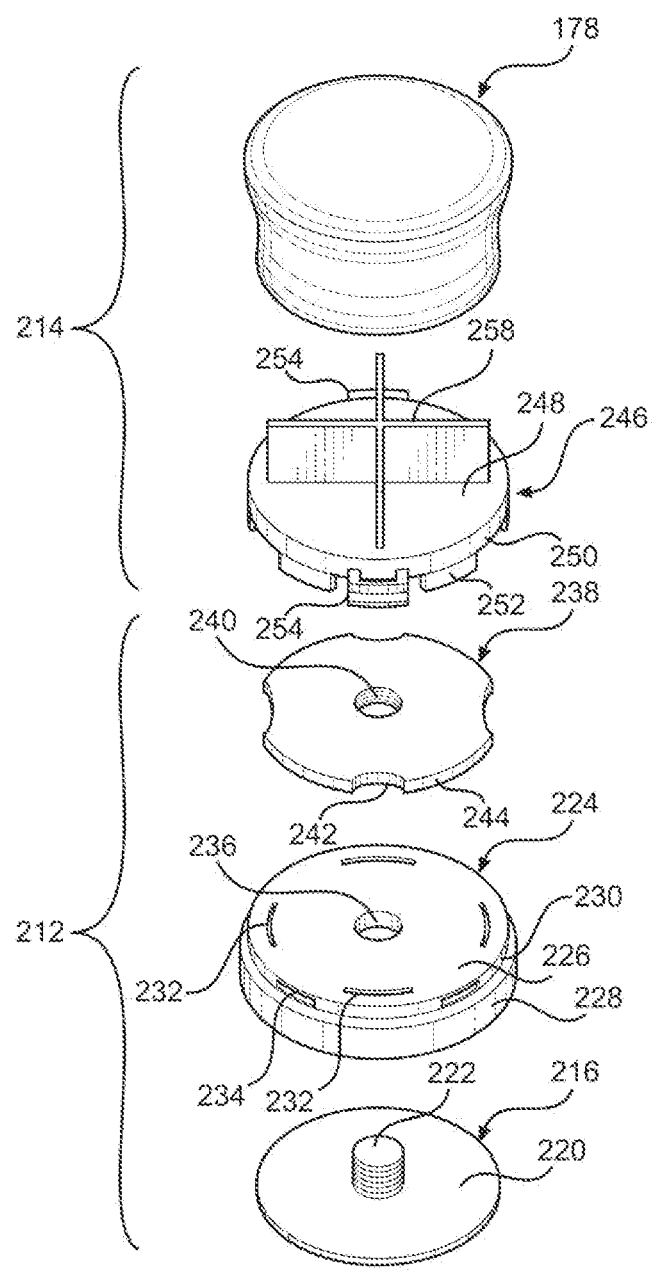
FIG. 21 depicts is an exploded view of the drying nub depicted in FIG. 20.

Referring now to the drawings in which like reference characters designate like or corresponding characters throughout the several views, there is shown in FIG. 1, an espresso machine 100 having a steam wand 102, and portafilters 104 mounted to groupheads 112. As shown in FIGS. 2-5, portafilters 104 typically include a basket or cup portion 108 that is mounted to a handle portion 110. A tamped puck of coffee grounds is formed in the cup portion 108 of the portafilter 104 prior to making each espresso drink. The cup portion 108 of the portafilter 104 is removably mounted to the groupheads 112 (FIG. 1) by engaging locking tabs 114 located on the left and right sides of the portafilter cup 108 with corresponding receivers located on the groupheads. A lip 116 extends beyond the locking tabs 114 and surrounds the entire perimeter of the cup 108 of the portafilter 104. One purpose of this lip 116 is to provide a leak-proof seal between the portafilter 104 and the grouphead 112. Once the tamped puck of coffee is formed within the cup 108 and the portafilter 104 is mounted to the espresso machine, hot water flows into the top of the cup (108A), through the puck of coffee and then out through the bottom of the cup (108B) as espresso. This particular portafilter 104 has a double spout 118 having two channels through which the espresso flows and is directed into cups. Other versions may have just a single spout. In the case of a spoutless portafilter, the cup portion 108 has a fine mesh located in its bottom end (108B) through which espresso drips into cups.

Referring again to FIG. 1, the use of knock boxes and barista towels is, and has always been, the standard industry practice for removing spent coffee grounds from a portafilter 104. Embodiments of the invention disclosed herein employ a jet of pressurized steam, supplied from an espresso machine 100 via the steam wand 102 or via some other source of steam, to split and eject the puck P of spent coffee grounds contained in the portafilter 104, flush the portafilter of any extraneous coffee grounds or oils, and sanitize and significantly warm the portafilter for the next use. Embodiments of the invention eliminate the loud physical banging and repetitive wiping necessary with a standard knock box. Embodiments of the invention reduce the potential for RSIs. Having simple or no moving mechanical parts and no electrical parts, embodiments of the invention can be thoroughly cleaned using health-code-approved water immersion procedures.

Depicted in these views is an apparatus 106 according to a first embodiment of the invention. The apparatus 106 generally includes a portafilter receiver 120 where a portafilter 104 having spent coffee grounds is inserted, a chute or receiving box 122 mounted below the portafilter receiver for receiving spent coffee grounds that fall from an inverted portafilter, and a steam tube 124 mounted to the receiving box for delivering a high-pressure supply of steam to break up and dislodge the puck P of spent coffee grounds from the portafilter and to cause the puck to fall into the receiving box.

With reference to FIGS. 6-11, the portafilter receiver 120 is designed to receive a portafilter having a puck of spent coffee grounds and to hold the portafilter securely during the cleaning process. The portafilter receiver 120 includes peripheral walls 126, 132 defining a central opening 128. A landing area 130 is mounted to the peripheral walls 126 of the portafilter receiver 120 and extends over at least a portion of the central opening 128. In some embodiments, the landing area 130 is solid. In other embodiments, a plurality of perforations 146 are formed in the landing area 130 that are sized to so that spent coffee grounds and liquids (e.g., condensed steam, espresso) fall through the perforations and into the receiving box 122. Additionally, in some embodiments, the landing area 130 is fixedly mounted to the peripheral walls 126. However, in this case, the landing area 130 can be removed from the peripheral walls 126 to enable a simpler cleaning process. Upper slots 150 are formed at the top of inner surfaces 152 of opposed peripheral walls 126 of the portafilter receiver 120. Additionally, lower slots 184 are formed midway down the inner surfaces 152 of opposing peripheral walls 126. The lower slots 184 are slightly spaced apart from the upper slots 150.

A centering feature 180, provided on both the left and right sides of the landing area 130, correctly locates the landing area 130 with respect to the portafilter receiver 120 and also securely mounts the landing area to the portafilter receiver. The centering feature 180 includes front and rear lateral prongs 182 that extend laterally outwards from the left and right sides of the landing area 130. The centering feature 180 also includes a vertical locking prong 186 that is positioned between the lateral prongs 182 and extends downwards from the landing area 130. The lateral prongs 182 are spaced apart such that they may be inserted into the notches 150. Inserting the lateral prongs 182 into the notches 150 easily and correctly locates the landing area 130 with respect to the portafilter receiver 120. As shown best in FIG. 12, in certain embodiments, the lateral prongs 182 have a sloped bottom surface 188 that contacts the notch 150, which may also be sloped. This contact fixes the landing area 130 at the desired vertical position with respect to the portafilter receiver 120. The vertical locking prong 186 includes a locking notch 190 that snaps into the lower slot 184 automatically once the landing area has reached the desired vertical position with respect to the portafilter receiver 120. This securely, though removably, mounts the landing area 130 to the portafilter receiver 120 and prevents it from being lifted out of the portafilter receiver 120 accidentally.

The landing area 130 includes a hole 134 that is configured so that spent grounds falling out of the inverted portafilter fall through the hole when the inverted portafilter is positioned over the landing area during the cleaning process. The hole 134 also assists in correctly positioning the portafilter 104 on the landing area 130 and also securely holding the portafilter throughout the cleaning process. In particular, the landing area 130 is sized and configured such that the top lip 116 (FIG. 2) of the portafilter 104 fits within the circular hole 134. However, certain areas of the cup portion 108 that surround the lip 116 do not fit within the hole 134. As a result of this design, the portafilter 104 falls partially into the hole 134 and is retained in that position when the cup portion 108 contacts the landing area 130 adjacent the hole. This quickly and correctly locates the portafilter 104 in the hole 134. Additionally, this design creates a seal around the lip 116 of the portafilter 104, which assists in guiding the steam into the cup portion 108 and also in guiding spent coffee grounds down into the receiving box 122. Tactile haptic feedback provided to the user by the portafilter 104 dropping into the hole 134 quickly confirms proper positioning and seating of the portafilter in the portafilter receiver 120.

Figure 2:
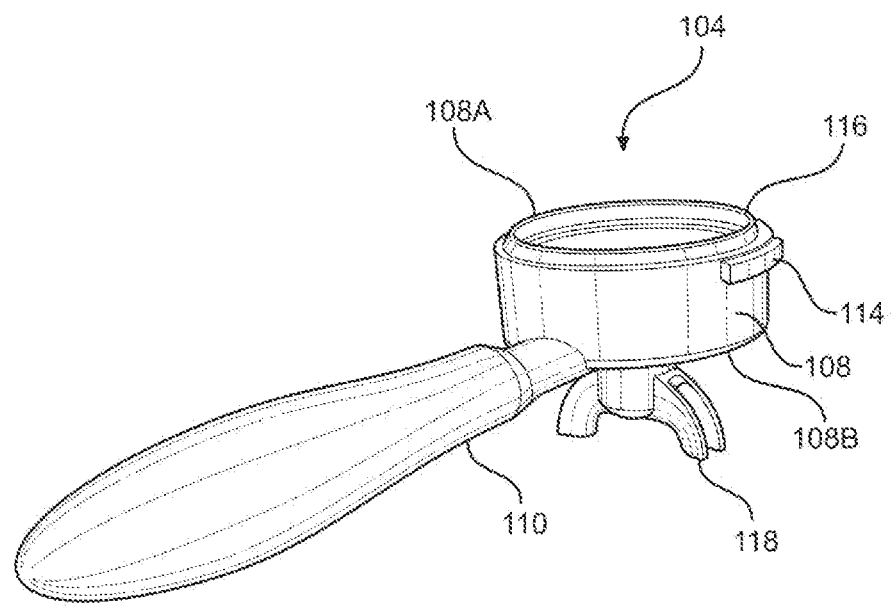
FIG. 2 is a perspective view a portafilter having a double spout.
Figures 3, 4, 5:
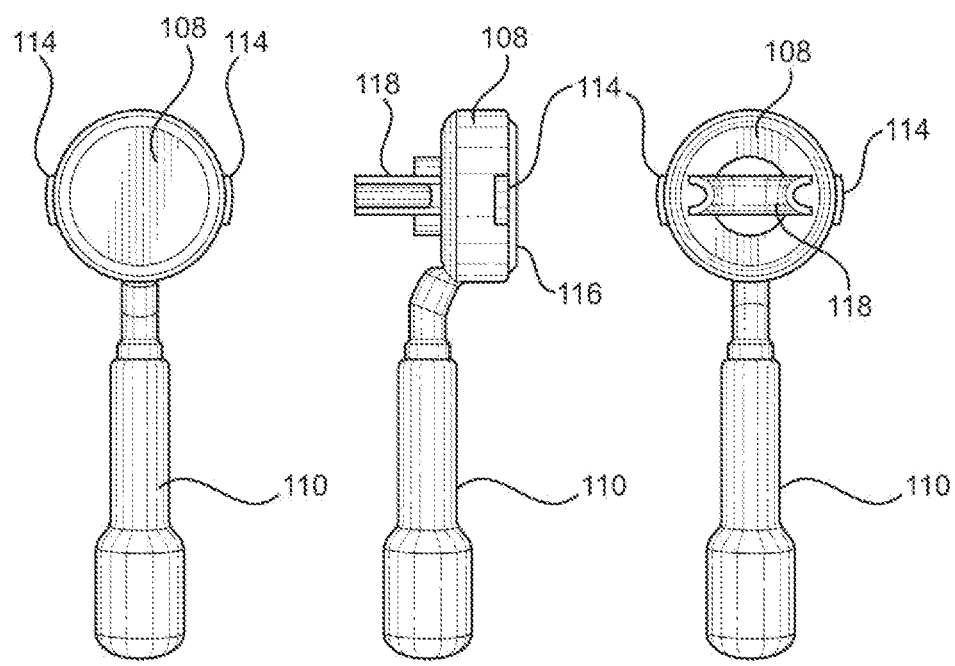
FIG. 3 is a front elevation view of the portafilter of FIG. 2.
FIG. 4 is a left-side elevation view of the portafilter of FIG. 2.
FIG. 5 is a rear elevation view of the portafilter of FIG. 2.
Figure 6:
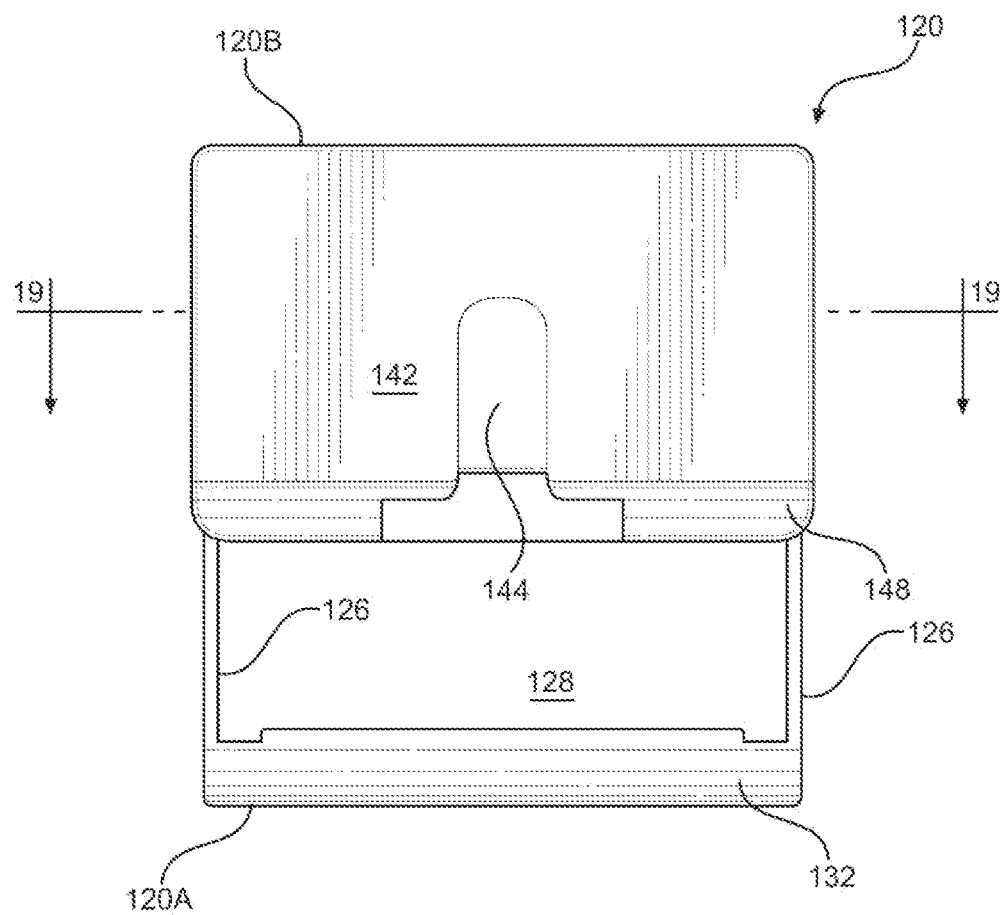
FIG. 6 is a plan view of a portafilter receiver according to an embodiment of the present invention.
Figure 8:
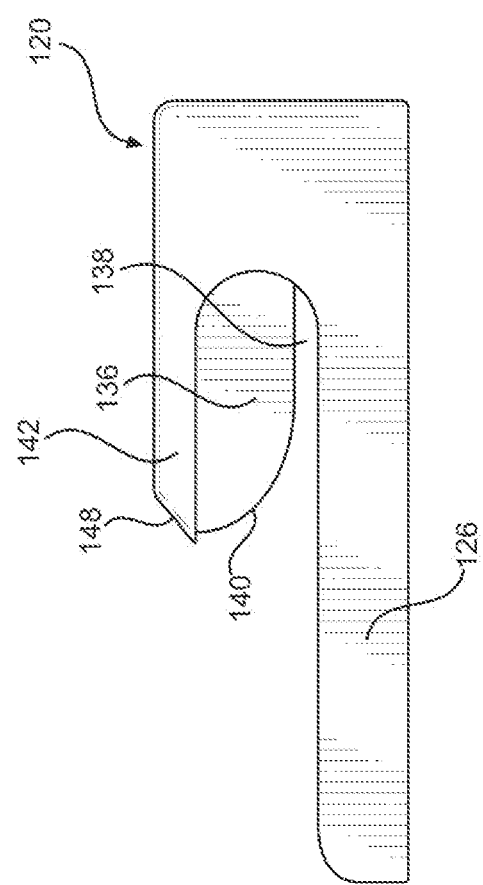
FIG. 8 is a right-side elevation view of the portafilter receiver shown in FIG. 6.
Figure 7:
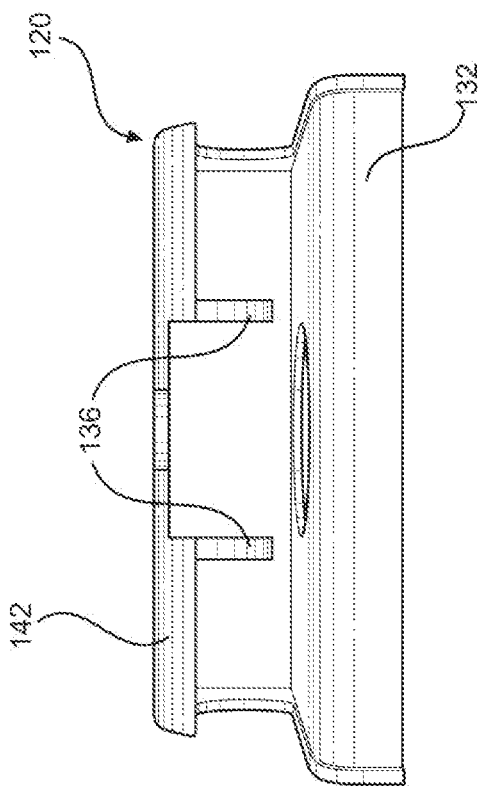
FIG. 7 is a front elevation view of the portafilter receiver shown in FIG. 6.
Figure 9:
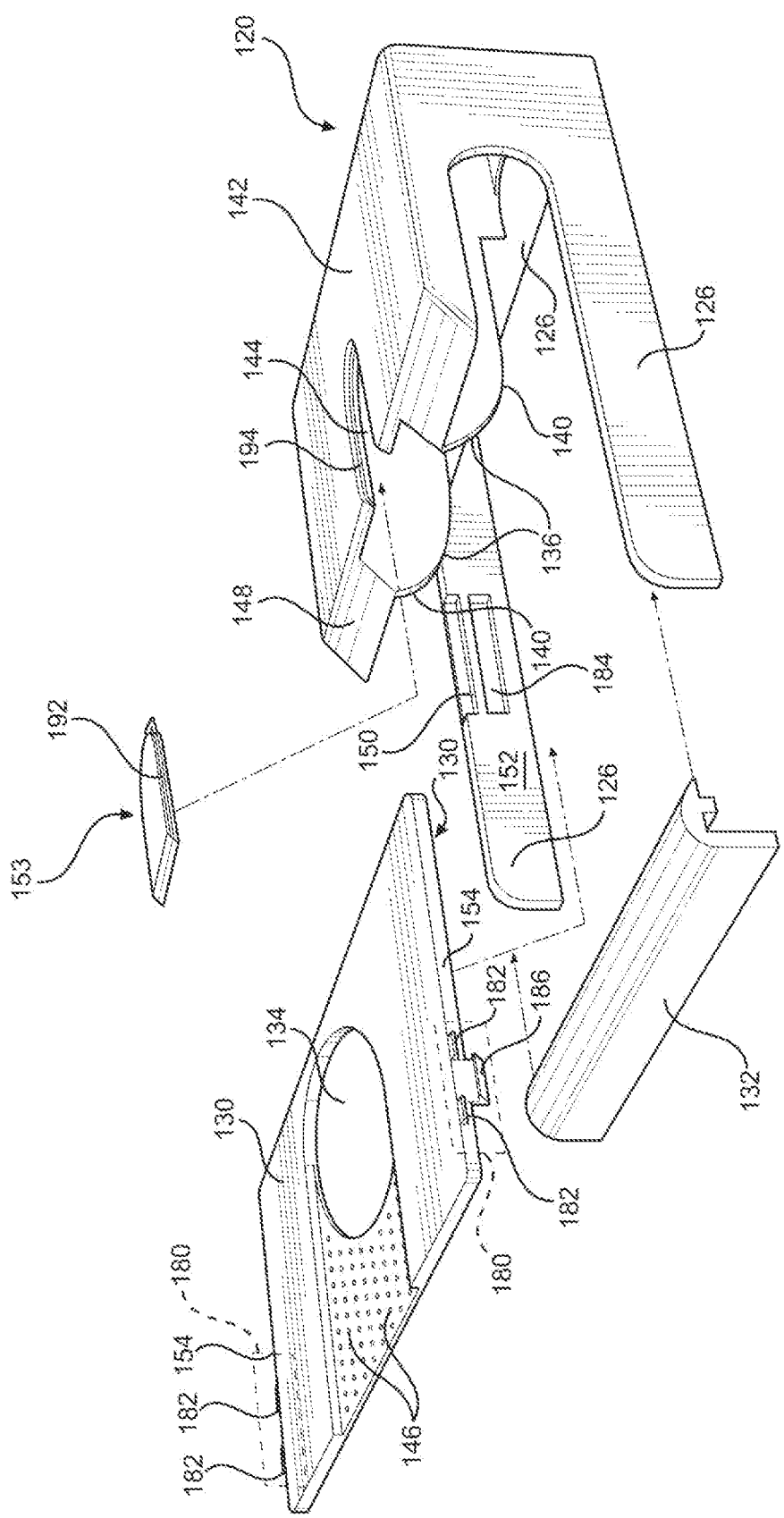
FIG. 9 is an exploded view of the portafilter receiver shown in FIG. 6.
Figure 10:
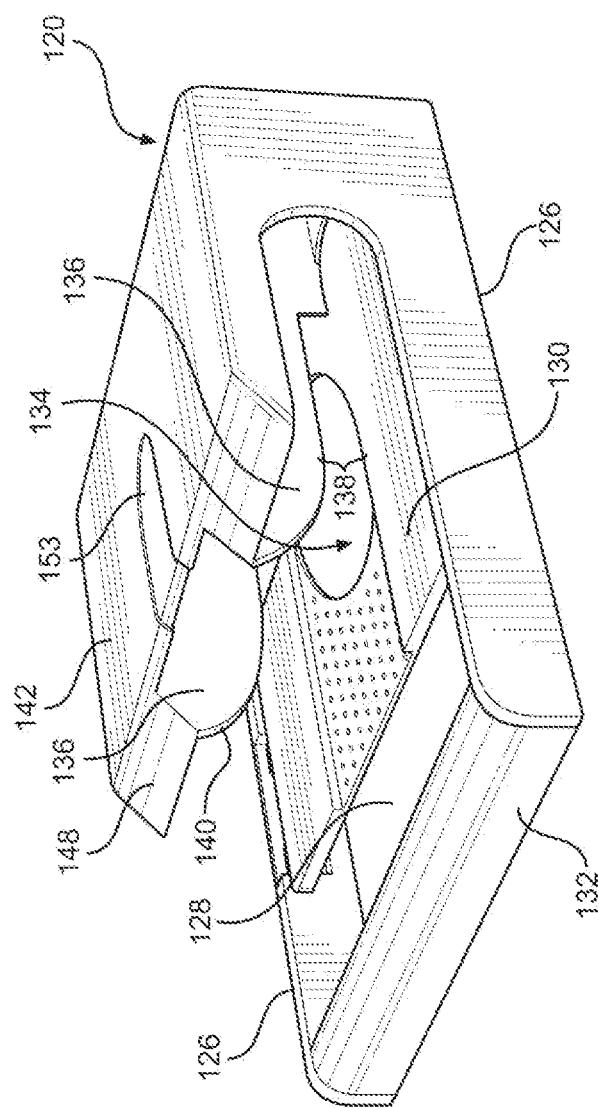
FIG. 10 is a top perspective view of the portafilter receiver shown in FIG. 6.
Figure 12:
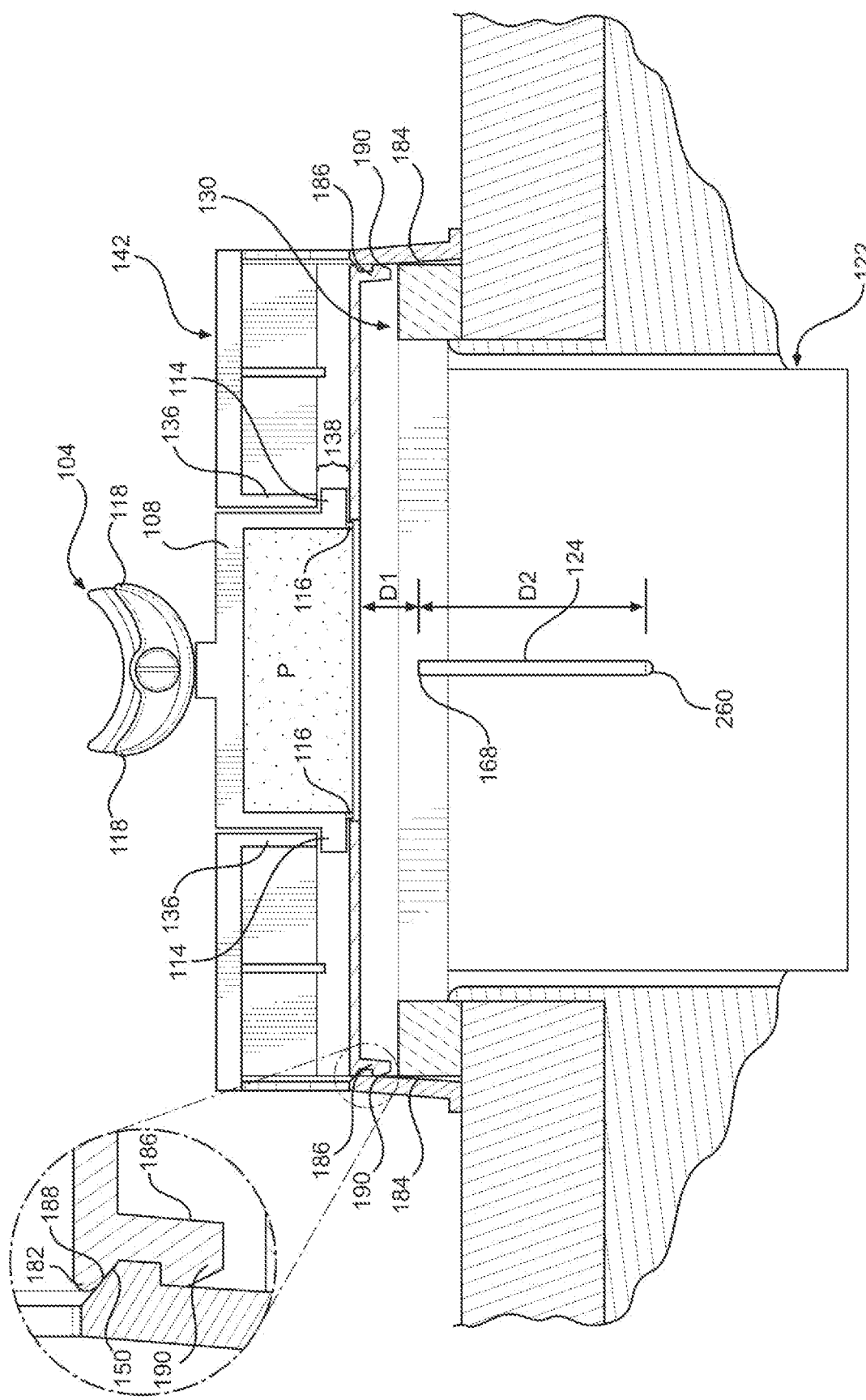
FIG. 12 is a cutaway view of a portafilter receiver mounted to a receiving box according to an embodiment of the present invention.
Figure 14:
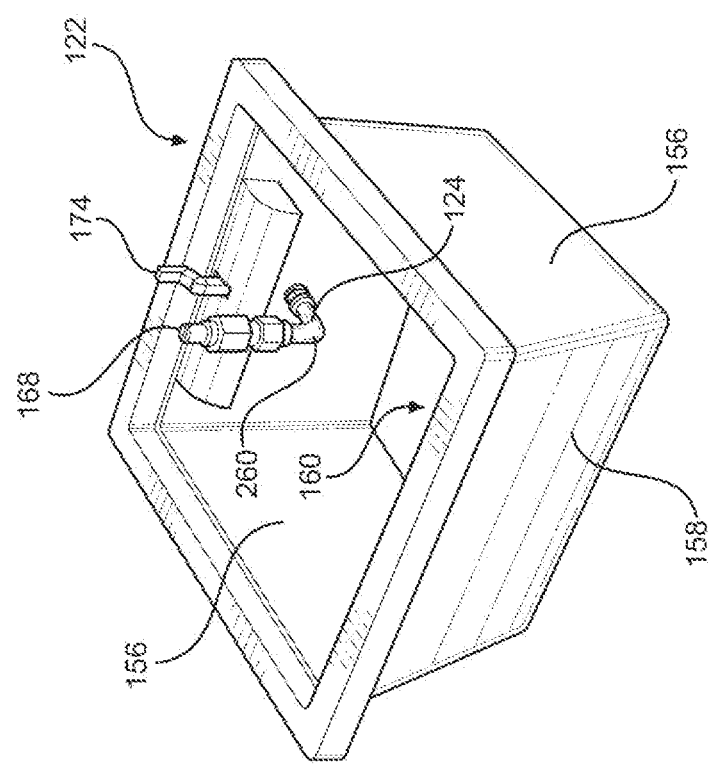
FIG. 14 is a perspective view of the receiving box illustrated in FIG. 13.
Figure 13:
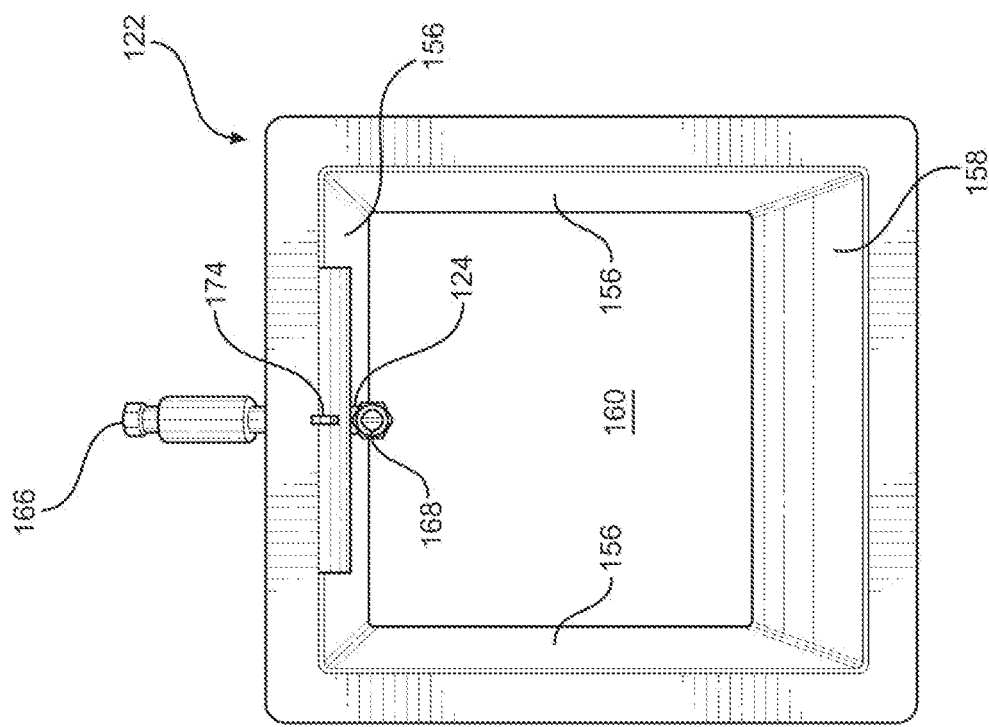
FIG. 13 is a plan view of a receiving box having a switch for activating the steam supply according to an embodiment of the present invention.
Figure 16:
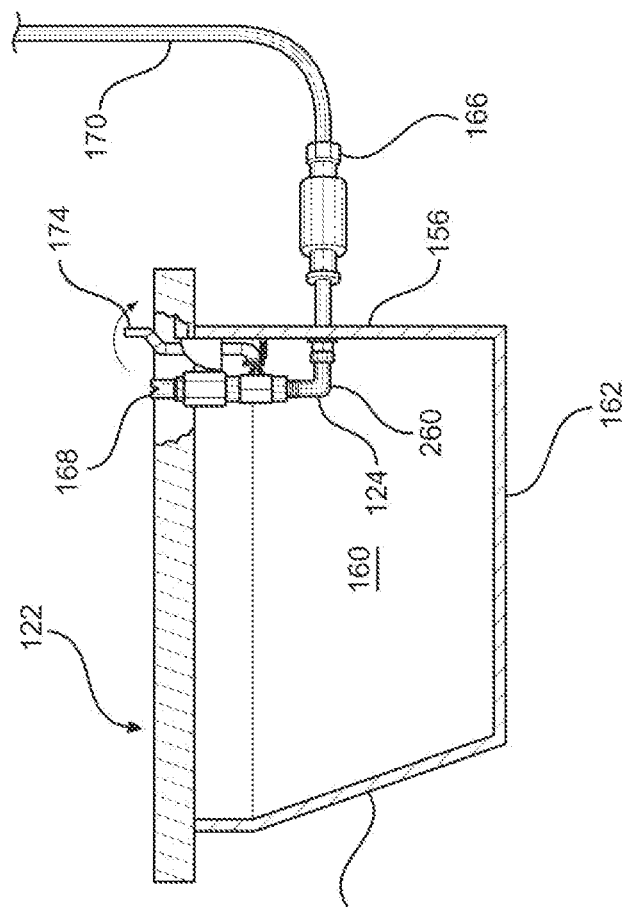
FIG. 16 is a right-side elevation view of the receiving box illustrated in FIG. 13.
Figure 15:
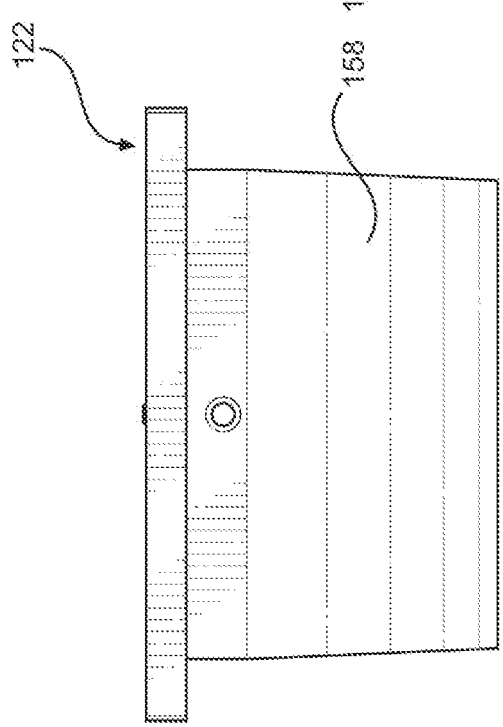
FIG. 15 is a front elevation view of the receiving box illustrated in FIG. 13.

With reference to FIGS. 10 and 12, left and right retention members 136 are spaced vertically above at least a portion of the landing area 130. Portafilter receiving slots 138 are defined between the retention members 136 and the landing area 130, which are sized and positioned to receive the left and right retention portions 114 of the portafilter 104 (FIG. 2). When the portafilter 104 is inserted, the left and right retention portions 114 slide into the portafilter receiving slots 138 and the cup portion 108 is positioned between the left and right retention members. This causes the portafilter 104 to be precisely centered in the portafilter receiver 120. Preferably the left and right retention members 136 have a curved front surface 140 that is contacted by the left and right retention portions 114 of the portafilter 104 and assists in inserting the portafilter into the portafilter receiver 120. Additionally, contacting this curved profile 140 with the left and right retention portions 114 of the portafilter 104 guides the portafilter 104 downwards towards the hole 134 as it is inserted. Preferably, the hole 134 and portafilter receiving slots 138 are configured such that the portafilter 104 cannot be fully inserted into the portafilter receiving slots 138 if the top lip 116 of the portafilter is not located in the hole 134. This structure provides tactile haptic feedback to inform the user that the portafilter 104 has been properly placed. Ideally, as a result of this feedback as well as the sizing, positioning, and contouring discussed above, insertion of the portafilter 104 into the portafilter receiver 120 is done quickly and easily, typically from muscle memory.

The left and right retention members 136 discussed above could be as simple as two separate bars that are spaced vertically above the landing area 130. However, in this particular embodiment, the with left and right retention members 136 are formed as lower portions of a steam containment shroud or cover 142. In this case, a portion of the peripheral walls 126 extends upwards beyond the landing area 130. The cover 142 is mounted between the extended peripheral walls 126 such that it extends over the landing area 130 and is configured to contain steam when a portafilter is inserted into the portafilter receiver 120 for cleaning. The steam containment cover 142 deflects and captures steam and condensation. In certain embodiments, to further assist in deflecting and capturing steam, a visor 148 is formed along a front edge of the cover 142 that is angled downwards towards the landing area 130 and that is configured direct steam traveling along the bottom surface of the cover downwards towards the landing area.

Figure 11:
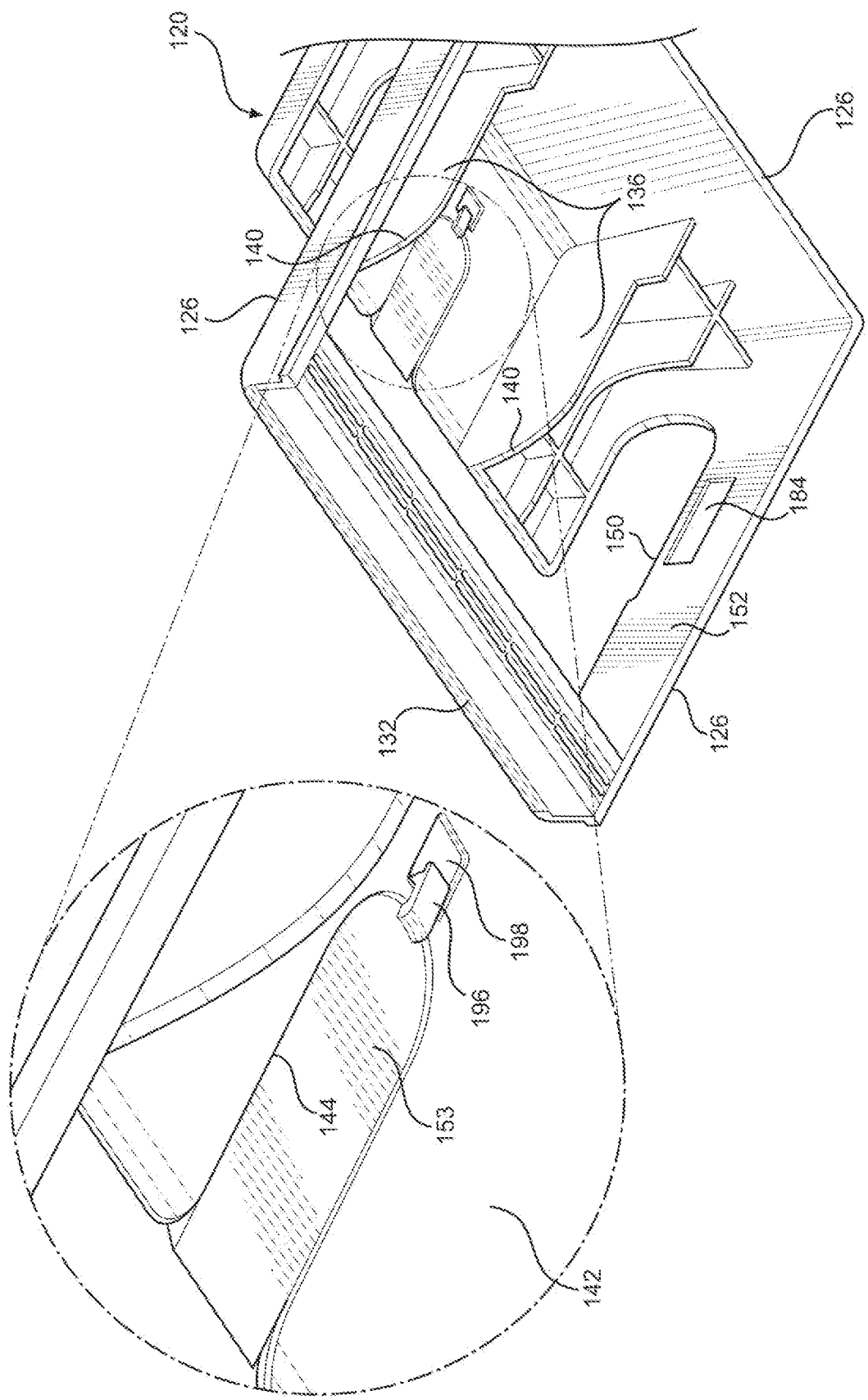
FIG. 11 is a bottom perspective view of the portafilter receiver shown in FIG. 6.

The cover 142 is spaced apart from the landing area 130 sufficiently far to allow the portafilter to be inserted for cleaning. However, this spacing is preferably minimized in order to reduce the amount of vertical space required for the apparatus 106. Preferably, the cover 142 is spaced apart from the landing area 130 by a distance slightly greater than the height of the cup portion 108 of the portafilter 104. In the case of a spoutless portafilter 104, the cover 142 extends continuously over the cup portion 108. However, as mentioned previously, certain portafilters 104 one or more spouts 118 (FIG. 2) that extend away from a bottom surface of the cup portion 108. To permit this type of spouted portafilter 104 to be inserted into the portafilter receiver 120 without increasing the overall height of the apparatus 106, a slot 144 is formed in the cover 142 that is configured to receive the spouts 118. When the slot 144 is not required (e.g., when a spoutless portafilter is being cleaned), a removable slot cover 153 may be placed into the slot 144. The slot cover 153 includes a valley section 192 extending into the perimeter of the slot cover. A corresponding ridge section 194 extends outwards along the inside of the slot 144. The ridge and valley sections 192, 194 are interchangeable and may be placed, alternatively, on either the slot 144 or slot cover 153. With reference to FIG. 11, a locking tab 196 extends away from the end of the slot cover 153 and automatically engages a corresponding notch 198 located on the bottom surface of the cover 142 when the slot cover is fully inserted into the slot 144 in order to lock the slot cover into engagement with the slot. As demonstrated above, the apparatus 106 is designed to accommodate both spoutless and spouted portafilters.

As discussed above, the apparatus 106 is intended to break up and dislodge spent coffee pucks from the cup 108 of a portafilter 104 using high-pressure steam. However, the apparatus 106 may also be configured to function as a traditional knockbox as well. As shown best in FIGS. 9 and 10, the landing area 130 discussed previously is mounted proximate the back end of the portafilter receiver 120. A front bash bar is mounted proximate the front end of the portafilter receiver 120. In this particular embodiment, peripheral wall 132 is configured to function as a bash bar.

As such, the front peripheral wall 132 may be a rigid bar having characteristics similar to traditional bash bars discussed above. However, in other embodiments, a separate dedicated bash bar may be mounted to the portafilter receiver 120 in addition to peripheral wall 132. The front bash bar is configured to dislodge spent coffee grounds from a portafilter when the portafilter is knocked against the bash bar. The spent grounds that are dislodged fall into the receiving box 122 via a section of the central opening 128 located between the bash bar 132 and the landing area 130.

With reference now to FIGS. 12-16, the receiving box 122 is mounted below the portafilter receiver 120 and includes peripheral walls 156, 158 defining a space 160 for receiving spent coffee grounds that fall from an inverted portafilter positioned over the landing area. In some cases (FIG. 16), the receiving box 122 also includes a bottom surface 162 that is mounted to the peripheral walls 156, 158 to enclose the bottom end of the space 160, in order to receive and hold spent coffee grounds that fall from an inverted portafilter positioned over the landing area. A receiving box 122 having an enclosed space 160 may be placed onto a countertop surface. In other cases (FIGS. 13, 14), the bottom end of the receiving box 122 is left open such that spent coffee grounds may fall from an inverted portafilter and out of the receiving box via the open bottom of the space 160. As illustrated in FIG. 1, an apparatus 106 having receiving box 122 with an open space 160 may be mounted into a countertop surface. A large refuse container 164 such as a trash can collect spent coffee grounds that fall through the receiving box 122. An advantage of this design is that significantly more spent coffee grounds may be collected than is typically collected in a traditional knock box.

In certain cases, one or more of the peripheral walls 156, 158 of the receiving box 122 is angled inwards such that the area of the space defined by a lower end of the peripheral walls is less than the area of the space defined by an upper end of the peripheral walls. In this particular case, front peripheral wall 158 is angled inwards. Reducing the size of the bottom end of the receiving box 122 simplifies the process of inserting the receiving box into a cutout in a countertop. Additionally, the sloped inner surface will tend to guide the falling coffee grounds as they fall into or through the space 160.

The steam tube 124 is a rigid tube through which steam flows from a steam source and is directed towards the portafilter 104. The steam tube 124 is mounted to the receiving box 122 and it includes a steam inlet 166 and a steam outlet 168. The steam inlet 166 is configured to connect to a pressurized steam supply. As shown in FIG. 1, a flexible connection hose 170 (FIG. 1) may be used to interface between the steam inlet 166 and the steam supply. The steam may be supplied from an espresso machine 100 via a steam wand 102 or other steam generating device. Preferably, the connection hose 170 includes suitable connection hardware for quickly connecting and disconnecting from the steam wand 102. For example, a push-button coupling or other suitable coupling may be used. Mounting the apparatus to the steam supply simply requires disconnecting the steam wand tip 172 from the steam wand 102 and then connecting the connecting the connection hose 170 to the steam wand.

The steam outlet 168 is an orifice of the proper size, physical configuration, and physical location to direct steam with the proper volume, velocity, pressure, and flow pattern into the portafilter 104 to remove spent coffee grounds P. As shown best in FIG. 12, the steam outlet 168 is oriented to direct pressurized steam through the hole of the landing area 130 and into the cup portion 108 of an inverted portafilter 104. One of the advantages of the portafilter receiver 120 design is that it correctly positions the portafilter 104 with respect to the steam tube 124. The distance D1 between the steam outlet 168 and the puck P is important. Ideally, that distance D1 is no greater than approximately 0.25 inch to 0.5 inch. Closer than that creates mechanical implementation issues. Farther away causes the steam to disperse too much and not completely clear the puck and spent grounds. However, D1 may be increased or decreased by varying operating parameters (e.g., steam pressure) or structural components (e.g., different steam outlet designs). The steam outlet 168 size and shape are important and is most effective in the range of about 0.15 inch to about 0.21-inch inside diameter with a knife blade shape. If the nozzle is smaller than about 0.15 inch, the steam blast can become too directed or narrow and simply blows a small hole in the coffee puck P without ejecting it or cleaning the sides of the portafilter 104. If the nozzle is larger than about 0.21 inch, the spray pattern can become too diffuse and can have insufficient pressure to properly clear the puck P. Additionally, the distance D2 between any curve or bend in the steam tube 124, such as a 90° bend that brings the steam tube 124 from the bottom side of the receiving box 122 to the portafilter 104 is also important. Any curve or bend 260 in the steam tube 124 is preferably more than approximately three inches away from the outlet. If the bend 260 is closer than that (for example, if the steam tube 124 were brought in at the top of the receiving box 122 rather than at the bottom and a tight 90° bend were made near the steam outlet 168), the laminar flow of the steam is disrupted and the steam would be less likely to clear the puck P and spent grounds. On the other hand, if any curve or bend is more than approximately three inches away, the steam regains its laminar flow and properly clears the puck P and spent grounds.

Figure 17:
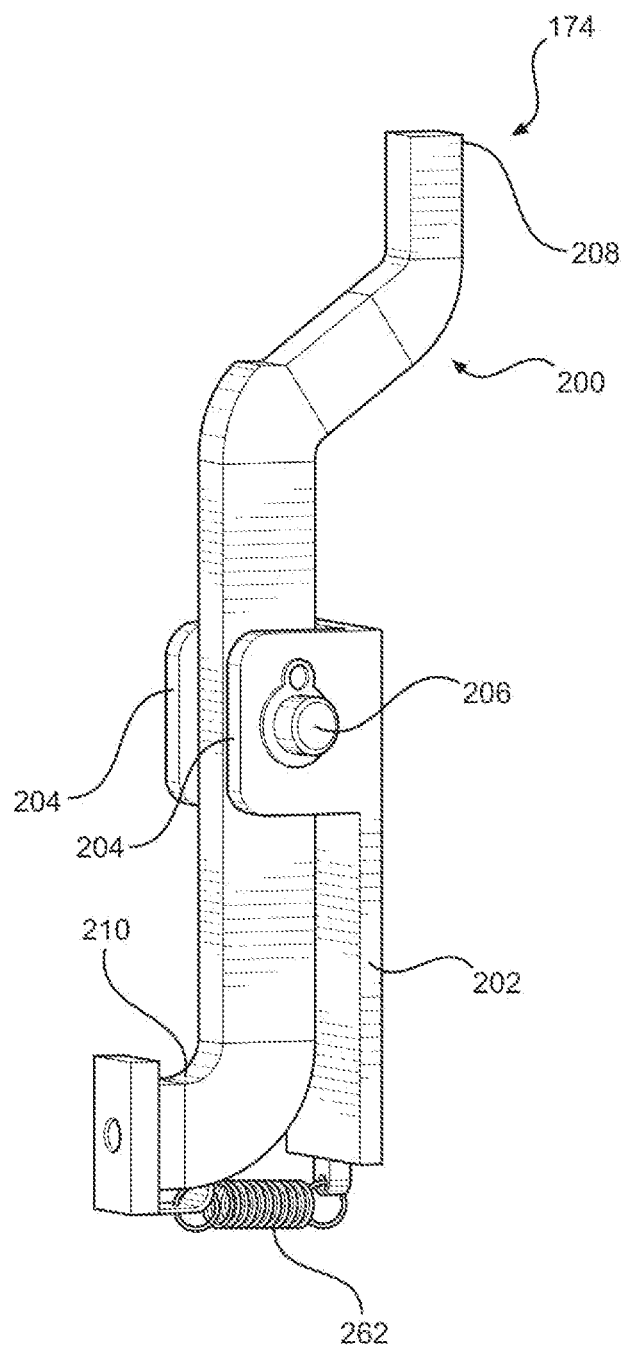
FIG. 17 depicts a switch for use in connection with a receiving box for releasing steam according to an embodiment of the present invention.
Figure 18:
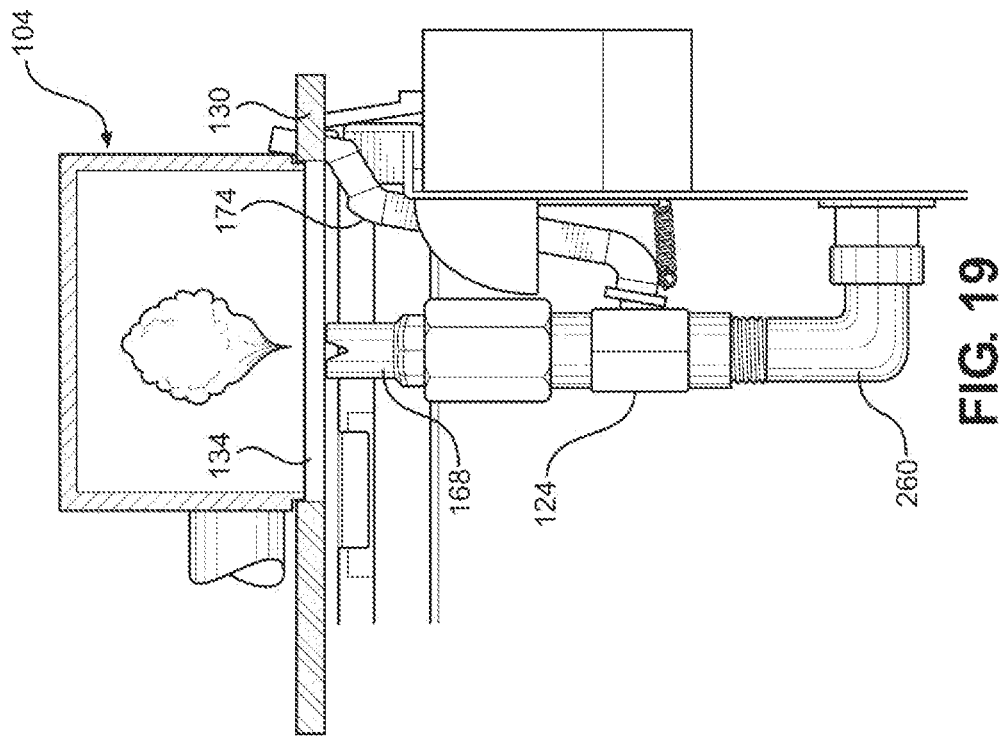
FIG. 18 depicts a portafilter receiver mounted to a receiving box having a switch in the closed position according to an embodiment of the present invention.
Figure 19:
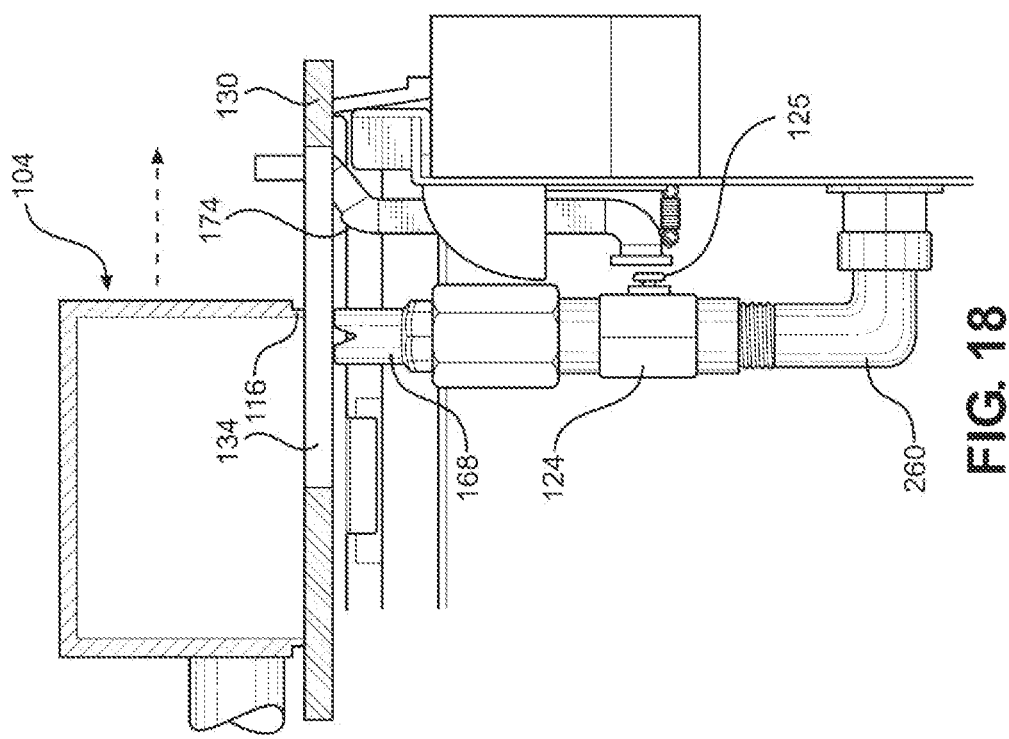
FIG. 19 depicts the receiving box in FIG. 18 after the switch has been moved to the open position such that steam is released and directed into a portafilter located in the portafilter receiver.

If the apparatus 106 is mounted to a steam wand 102 of an espresso machine 100, as discussed above, steam may be provided by activating the steam wand. However, more preferably, the high-pressure steam is provided automatically to facilitate a faster cleaning process. Accordingly, with reference to FIGS. 17-19, the apparatus 106 includes a switch 174 for automatically activating the steam supply. The switch 174 shown in FIG. 17 includes a rocker 200 that is rotatably mounted to a mounting plate 202. Arms 204 extend outward from one end of the mounting plate 202 and a pin 206 extends between the arms 204 and also through the rocker 200 to rotatably mount the rocker to the mounting plate. A first end 208 of the rocker 200 extends upwards and is positioned so that it is adjacent the hole 134 of the landing area 130. The first end 208 is configured to be contacted by a portafilter 104 when the portafilter is fully inserted into the portafilter receiver. A second end 210 of the rocker 200 is configured to contact a button valve 125 of the steam tube 124 and to, thereby, release steam. Other similar methods for releasing steam through the steam tube 124 using the switch 174 are also contemplated. Accordingly, pushing the first end 208 with the portafilter 104 causes the rocker 200 to move from a "closed" or forward position, where steam does not flow through the button valve 125, to an "open" or backward position, where the rocker contacts the steam tube and steam is allowed to flow through the steam tube. The rocker 200 is biased to the closed position by a spring member 262 that is mounted between the second end 210 of the rocker 200 and the mounting plate 202. Accordingly, as shown in FIG. 19, inserting the portafilter 104 fully into the portafilter receiver 120 automatically activates the steam when the portafilter is correctly positioned and ready to be cleaned. Additionally, withdrawing the portafilter 104 from the portafilter receiver 120 automatically deactivates the steam supply as the switch 174 is biased from the open position to the closed position (FIG. 18).

Figure 20:
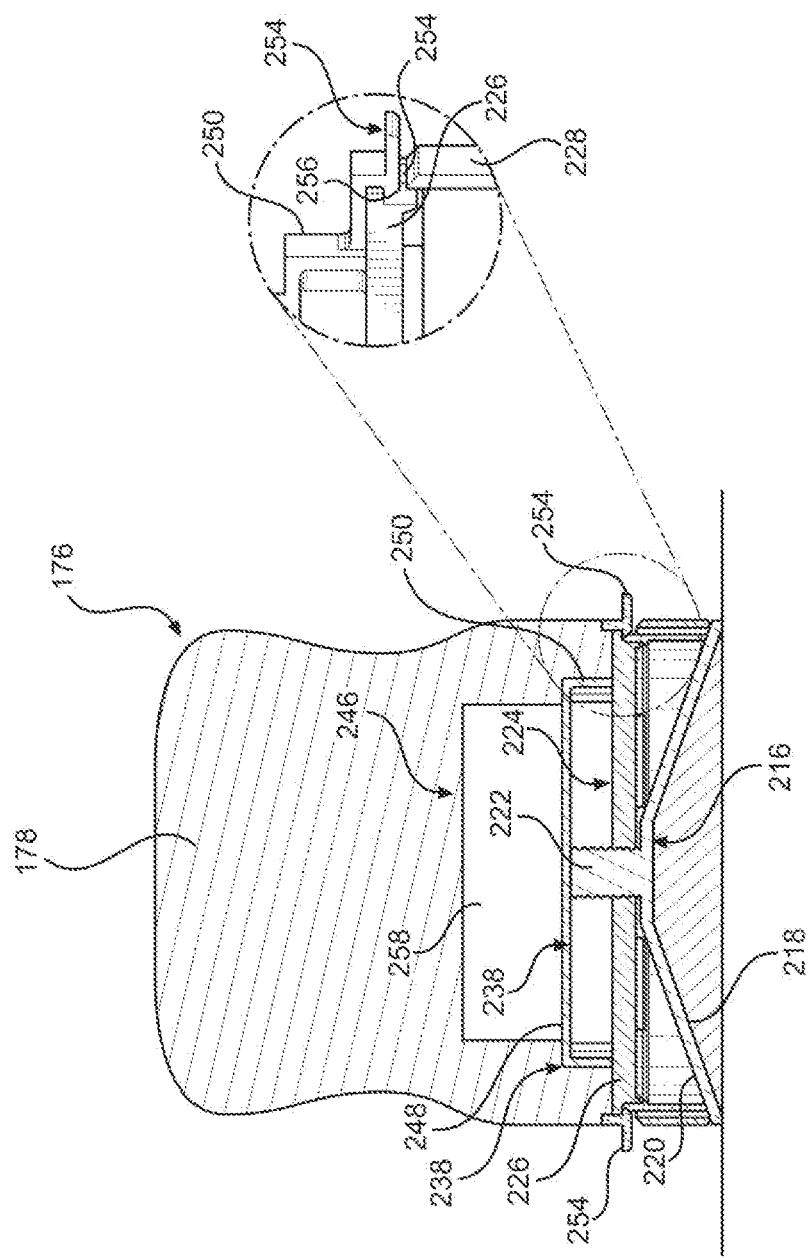
FIG. 20 is a sectional view of a drying nub used for drying a portafilter after the cleaning process is complete.

With reference to FIGS. 20 and 21, some embodiments may include an attached or detached drying nub 176. The drying nub 176 is dimensionally similar to the interior of the cup portion 108 of a portafilter 104. The inside cup portion of a portafilter is placed over the drying portion of the nub to remove residual dampness, or if they still remain any oils or grounds, from a portafilter after the cleaning process. The drying nub 176 includes of drying portion 178 that is covered with a pliable material, such as a sponge covered in terry cloth. The top and bottom portions of the drying portion 178 may be flared out in order to compress around the rim and crevices inside of the portafilter. Preferably, the drying portion 178 is easily removable and replaceable from the rest of the drying nub 176, which may be fixedly or semi-fixedly mounted. Accordingly, the drying nub 176 is made up of generally of a bottom portion 212 that is configured to fixedly mount to a countertop (or another mounting surface such as the cover 142 discussed above) and a top portion 214 configured to quickly connect to and disconnect from the bottom portion.

The bottom portion 212 includes a suction cup 216 having a bottom surface 218 configured to suction to the countertop, a top surface 220, and a threaded member 222 extending upwards from the top surface.

Next, a first mounting cup 224 is positioned above the suction cup 216 and is defined by a circular top surface 226 joined to a circular peripheral wall 228 at a notched shoulder section 230 located between the top surface and the peripheral wall. In this particular embodiment, four anti-rotation slots 232 are distributed around the top surface 226 of the first mounting cup 224 and are arranged in a cross-shaped pattern. Also, two anti-lift slots 234 are located in a notched shoulder section 230. The function of the anti-rotation slots 232 and the anti-lift slots 234 are described in more detail below. However, it is noted that more or fewer of each of the anti-rotation slots 232 and the anti-lift slots 234 may be used in other embodiments and depending on the application. The number of anti-rotation slots 232 and the anti-lift slots 234 shown in the figures should not be considered a limitation of this disclosure. A central opening 236 is disposed in the top surface 226 of the first mounting cup 224. When the first mounting cup 224 is placed over the suction cup 216, the central opening 236 allows the threaded member 222 of the suction cup to extend past the peripheral wall 228 and out of the top surface 226 of the first mounting cup.

Next, a suction cup retainer 238 is placed on top of the first mounting cup 224 and connects to the suction cup 216 while sandwiching the first mounting cup in between. The suction cup retainer in this particular case is shaped like a puck and includes a threaded central opening 240 that is configured to thread onto the threaded member 222 in order to pull and securely hold the suction cup 216 against the first mounting cup 224. Ideally, by tightly threading the suction cup retainer 238 to the suction cup 216, the first mounting cup 224 is securely fixed and is prevented from rotating with respect to the suction cup 216. In this way, when the suction cup 216 is mounted to a countertop, the first mounting cup 224 is rotationally fixed in place. To assist in sufficiently tightening the suction cup retainer 238 to the suction cup 216, four turn-assist features 242 are formed in a peripheral wall 244 of the suction cup retainer 238. The turn-assist features 242 are configured to be contacted by a user's fingers during the turning process to assist in threading and tightening the suction cup retainer 238 onto the threaded member 222 of the suction cup 216. Again, it is noted that more or fewer of each of the turn-assist features 242 may be used in other embodiments and depending on the application. The number of turn-assist features 242 shown in the figures should not be considered a limitation of this disclosure.

As discussed above, the top portion 214 is configured to quickly connect to and disconnect from the bottom portion 212. The top portion 214 includes a second mounting cup 246 that is defined by a circular top surface 248 joined to a circular peripheral wall 250. The second mounting cup 246 is configured to removably mount on top of the first mounting cup 224 and to resist being turned or lifted from the first mounting cup until selectively removed by a user. The second mounting cup 246 is sized so that the suction cup retainer 238 fits entirely within the peripheral wall 250 and also within a space formed between the top surfaces of the first and second mounting cups 226, 248 when a bottom end of the peripheral wall of the second mounting cup 246 is in contact with the top surface of the first mounting cup 224.

The second mounting cup 246 includes four anti-rotation teeth 252 extending downwards from the bottom end of the peripheral wall 250. The anti-rotation teeth 252 are configured for insertion into the four anti-rotation slots 232 of the first mounting cup 224. As discussed above, the first mounting cup 224 is rotationally fixed due to the suction cup retainer 238. Inserting the anti-rotation teeth 252 into the anti-rotation slots 232 prevents the second mounting cup 246 from rotating with respect to the first mounting cup 224 and, therefore, rotationally fixes the second mounting cup 246 as well. This allows the portafilter cup (basket) to be inserted over the drying portion 178 and then rotated leftwards and rightwards to dry and clean the inside of the cup.

Additionally, two anti-lift locks 254 are located on the peripheral wall 250 of the second mounting cup 246. Each of the anti-lift locks 254 have locking portions 256 configured to automatically engage the two anti-lift slots 234 of the first mounting cup 224 when the top portion 214 is pushed downwards onto the bottom portion 212 in a selected orientation. The selected orientation is any orientation where the anti-rotation teeth 252 are aligned with the anti-rotation slots 232. When the anti-lift locks 254 engage the anti-lift slots 234, the top portion 214 is prevented from being lifted from the bottom portion 212. This allows the portafilter cup to be inserted and then removed from the drying nub 176 without the top portion 214 separating from the bottom portion 212. In this particular case, the top portion 214 may easily disengaged from bottom portion 214 when desired by lifting up on both locks 254 to cause their locking portions 256 to be rotated out of engagement with the locking slots 254.

The drying portion 178 is sized and configured to fit inside of the cup portion 108 of a portafilter 104 to clean and dry the portafilter. The drying portion 178 is fixedly mounted to the top surface 248 of the second mounting cup 246. In certain cases, the drying portion 178 may simply mounted to the top surface 248. However, in this particular case, a securement member 258 extends upwards from the top surface 248 of the second mounting cup 246 and is inserted into the bottom end of the drying portion 178. In this particular case, the securement member 258 is a "+" shaped extension from the top surface 248, which is adhesively bonded to the drying portion 178.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An apparatus for cleaning and drying a portafilter, said apparatus comprising:
   a steam inlet;
   a portafilter receiver over which the portafilter is inverted;
   a steam tube including said steam inlet and a steam outlet oriented to direct pressurized steam into a cup portion of the portafilter;
   a coupling for connecting said steam inlet to a pressurized steam supply; and
   a high-pressure steam supply mounted to the steam inlet of the steam tube for providing on-demand steam via the steam outlet.

2. The apparatus of claim 1, further comprising:
   said portafilter receiver having peripheral walls defining a central opening;
   a landing area mounted to the peripheral walls of said portafilter receiver and extending over at least a portion of said central opening;
   a hole disposed in the landing area configured so that spent grounds falling out of the inverted portafilter fall through said hole when the portafilter is inverted and positioned over the landing area; and
   a receiving box mounted below the portafilter receiver and having peripheral walls defining a space for receiving spent coffee grounds that fall from an inverted portafilter positioned over the landing area.

3. The apparatus of claim 2 further comprising a cover formed between the peripheral walls of the portafilter receiver and extending over at least a portion the central opening such that at least a portion of the landing area is covered.

4. The apparatus of claim 3 further comprising a slot formed in the cover that is configured to receive a spout portion extending away from a portion of the portafilter when a spouted portafilter is inverted and then inserted into the portafilter receiver, and a slot cover configured for removable insertion into the slot when the slot is not needed such that the cover has a substantial top surface for catching and diverting steam.

5. The apparatus of claim 3 further comprising a visor formed along a front edge of the cover that is angled downwards towards the landing area and that is configured direct steam traveling along the bottom surface of the cover downwards towards the landing area.

6. The apparatus of claim 2 further comprising a switch that is biased to a closed position for not allowing steam to flow through the steam tube and that may be selectively moved to an open position for allowing steam to flow through the steam tube, wherein the switch is located proximate the landing area and is moved to the open position by the portafilter when the portafilter is inserted into the portafilter receiver and wherein the switch is automatically moved to the closed position when the portafilter is withdrawn from the portafilter receiver.

7. An apparatus for cleaning and drying a portafilter, said apparatus comprising:
   a portafilter receiver over which the portafilter is inverted, said portafilter receiver having peripheral walls defining a central opening;
   a steam tube having a steam inlet configured to connect to a pressurized steam supply and a steam outlet oriented to direct pressurized steam into a cup portion of the portafilter;
   a landing area mounted to the peripheral walls of said portafilter receiver and extending over at least a portion of said central opening;
   left and right retention members spaced vertically above at least a portion of the landing area;
   a hole disposed in the landing area configured so that spent grounds falling out of the inverted portafilter fall through said hole when the portafilter is inverted and positioned over the landing area;
   a receiving box mounted below the portafilter receiver and having peripheral walls defining a space for receiving spent coffee grounds that fall from an inverted portafilter positioned over the landing area; and
   portafilter receiving slots defined between the retention members and the landing area, the portafilter receiving slots being sized, shaped, and positioned to receive left and right retention portions of the portafilter and to automatically direct the portafilter towards the hole as the portafilter is inserted into the portafilter receiver, to securely hold the portafilter above the landing area, and to center the cup portion of the portafilter over the hole when the portafilter is fully inserted into the portafilter receiving slots.

8. The apparatus of claim 7 wherein the hole in the landing area is sized such that a top lip of the portafilter fits within the hole but left and right retention portions of the portafilter do not fit within the hole, such that the portafilter falls partially into the hole and is retained in that position when the left and right retention portions of the portafilter contact portions of the landing area adjacent the hole, and wherein the hole and portafilter receiving slots are configured such that the portafilter may not be fully inserted into the portafilter receiving slots if the top lip of the portafilter is not located in the hole.

9. A drying nub comprising:
   a drying portion in turn including a bottom portion of a sponge-like material with a cover of pliable material, said drying portion sized and configured to fit inside a cup portion of a portafilter for drying the portafilter;
   a bottom portion and a top portion removably mounted to the bottom portion, wherein the drying portion is fixedly mounted to the top portion and wherein, when the top portion is mounted to the bottom portion, the top portion is prevented from rotating with respect to the bottom portion when the drying portion is in use to clean and dry a portafilter;
   a threaded opening formed in the bottom portion of the drying nub;
   a fixed attachment member having a top surface and a bottom surface configured to mount to the mounting surface; and
   a threaded member extending upwards from the top surface of the fixed attachment member that is configured to thread into the threaded opening to mount the fixed attachment member to the bottom portion of the drying nub.

10. The drying nub of claim 9 wherein the bottom portion of the drying nub comprises:
   a first mounting member defined by a circular top surface joined to a circular peripheral wall at notched shoulder section located between the top surface and the peripheral wall;
   a central opening extending through a top surface of the first mounting member, wherein the threaded member is sized and configured to extend upwards through the central opening of the top surface when the fixed attachment member is located below the top surface of the first mounting suction cup such that a threaded portion of the threaded member is exposed above the top surface of the first mounting member; and
   a retainer having a threaded central opening configured to thread onto the portion of the threaded member that is exposed above the top surface of the first mounting member in order to pull and securely hold the fixed attachment member against the first mounting member.

11. The drying nub of claim 10 further comprising one or more turn-assist features formed in the retainer configured to be contacted by a user's fingers during the turning process and to assist in threading and tightening the retainer onto the threaded member.

12. The drying nub of claim 10 further comprising:
one or more anti-rotation slots distributed in a top surface of the bottom portion; and
one or more anti-rotation teeth extending from a bottom surface of the top portion, whereby inserting the whereby inserting the anti-rotation teeth into the anti-rotation slots prevents the top portion from rotating with respect to the bottom portion.

13. The drying nub of claim 10 further comprising:
two or more anti-lift slots disposed proximate a top surface of the bottom portion;
two or more anti-lift locks having locking portions configured to automatically engage the two or more anti-lift slots the top portion is pushed downwards into engagement with the bottom portion in a selected orientation and, through said engagement, the top portion is prevented from being lifted from the bottom portion.

14. The drying nub of claim 10 further comprising:
a securement member extending upwards from the top surface of the top portion, wherein the drying portion is adhesively attached to the securement member.

* * * * *